United States Patent
Vaidya (10) Patent No.: US 7,735,078 B1
(45) Date of Patent: Jun. 8, 2010

(54) SYSTEM AND METHOD FOR SOFTWARE PATCHING FOR CROSS-PLATFORM PRODUCTS

(75) Inventor: Neelam N. Vaidya, Cupertino, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1700 days.

(21) Appl. No.: 10/696,964

(22) Filed: Oct. 30, 2003

(51) Int. Cl.
*G06F 9/44* (2006.01)

(52) U.S. Cl. .................. 717/171; 717/168; 717/169; 717/170; 717/172; 717/173

(58) Field of Classification Search .......... 717/168–173
See application file for complete search history.

(56) References Cited

U.S. PATENT DOCUMENTS

| | | | |
|---|---|---|---|
| 5,586,304 A | 12/1996 | Stupek et al. | |
| 5,872,979 A | 2/1999 | Edel et al. | |
| 5,960,204 A | 9/1999 | Yinger et al. | |
| 5,974,258 A | 10/1999 | Ferri et al. | |
| 6,161,218 A * | 12/2000 | Taylor | 717/174 |
| 6,202,207 B1 | 3/2001 | Donohue | |
| 6,347,397 B1 | 2/2002 | Curtis | |
| 6,360,365 B1 | 3/2002 | Curtis | |
| 6,367,075 B1 | 4/2002 | Kruger et al. | |
| 6,434,744 B1 * | 8/2002 | Chamberlain et al. | 717/168 |
| 6,442,754 B1 | 8/2002 | Curtis | |
| 6,477,703 B1 | 11/2002 | Smith et al. | |
| 6,529,784 B1 | 3/2003 | Cantos et al. | |
| 6,571,389 B1 | 5/2003 | Spyker et al. | |
| 6,601,236 B1 * | 7/2003 | Curtis | 717/177 |
| 6,687,902 B1 | 2/2004 | Curtis et al. | |
| 6,859,923 B2 | 2/2005 | Taylor | |
| 6,883,169 B1 | 4/2005 | Guilbeault et al. | |
| 2001/0056572 A1 | 12/2001 | Richard et al. | |
| 2002/0100036 A1 * | 7/2002 | Moshir et al. | 717/173 |
| 2002/0133814 A1 | 9/2002 | Bourke-Dunphy et al. | |
| 2002/0174422 A1 | 11/2002 | Kelley et al. | |

(Continued)

OTHER PUBLICATIONS

PatchLink Corporation,"PatchLink Update 4.0 White Paper Cross-platform Security Patch Management", 2002.*

(Continued)

*Primary Examiner*—Wei Y Zhen
*Assistant Examiner*—Junchun Wu
(74) *Attorney, Agent, or Firm*—Robert C Kowert; Meyertons, Hood, Kivlin, Kowert & Goetzel, P.C.

(57) ABSTRACT

A system and method for cross-platform patching of applications. The method may include deploying a patch package on a first computer running a first type of operating system, and executing the patching mechanism on the first computer. The patch package may include a patching mechanism operable to execute on a second computer running a second type of operating system. The patch package may also include a first set of one or more new code components, which may replace a first set of one or more old code components in a first application. The patch package may also be deployed on the second computer. The method may also include replacing a second set of one or more old code components in a second application on the second computer with a second set of one or more new code components included in the patch package.

22 Claims, 6 Drawing Sheets

U.S. PATENT DOCUMENTS

| | | |
|---|---|---|
| 2003/0159138 A1 | 8/2003 | Curtis |
| 2003/0163807 A1 | 8/2003 | Drake et al. |
| 2003/0195951 A1 | 10/2003 | Wittel et al. |
| 2003/0218628 A1 | 11/2003 | Deshpande et al. |
| 2003/0220992 A1 | 11/2003 | DiRico |
| 2003/0221190 A1 | 11/2003 | Deshpande et al. |
| 2003/0233648 A1 | 12/2003 | Earl et al. |
| 2004/0015946 A1 | 1/2004 | Te'eni et al. |
| 2004/0088694 A1* | 5/2004 | Ho ............................ 717/170 |

OTHER PUBLICATIONS

"RPM Package Managers," www.rpm.org, Mar. 7, 2003, (5 pages).

* cited by examiner

SYSTEM AND METHOD FOR SOFTWARE PATCHING FOR CROSS-PLATFORM PRODUCTS

BACKGROUND OF THE INVENTION

1. Field of the Invention

This invention relates to the field of computer systems and, more particularly, to a method for patching cross-platform software.

2. Description of the Related Art

Most modern software must face the inevitability of program errors, or "bugs", and of fixing these same bugs. One traditional method is to provide the end user with an entirely new copy of the software in question, in which the offending bugs have been eliminated.

However, this method faces several difficulties. Cost or bandwidth limitations may make it inefficient to recompile, distribute, and install an entirely new piece of software, especially if only a small part of the software needs to be changed. Software providers may not wish to release new versions of software to fix each individual bug, but if end users are made to wait too long between bug fixes, they may become dissatisfied with the product. Alternatively, bug fixes may be provided in new versions of the software, but new versions may also include new behavior or features that break compatibility with the old software.

An alternative approach to fixing bugs is to "patch" the software, which involves replacing only those components of the software that contain bugs, rather than the entire application. The patch process may be simplified if an application is comprised of one or more individual library components, since only those libraries that contain the bug may need to be replaced. Compiling and distributing individual library components may be considerably simpler than compiling and distributing an application.

However, the increased simplicity of patching software may lead to many more revisions of the software, compared to a methodology where the entire application is replaced. Since each individual patch may need to be tested against some or all other patched versions of the application, patching may increase the burden on software providers to track and test their software. This burden may be even further increased if the provider offers multiple versions of the software on multiple platforms.

In addition to fixing bugs, end users may also need to be notified of bugs, and of fixes to bugs. Detection of particularly severe bugs may lead to the provider directly contacting the end user with a bug fix. However, direct contact may not be practical for all bugs, and the software provider may have difficulty contacting all its customers. Alternatively, end users may be required to keep track of the latest bug fixes themselves, but if an end user has multiple pieces of software, each from a different software provider, keeping track of bug fixes may become difficult and/or time-consuming.

One solution to the above problem is to have the computer make automatic checks for bug fixes over the Internet, either through the target software itself or through a software update system built into the operating system. While both these methods are improvements over tracking bug fixes manually, both may also have drawbacks. For example, adding bug fix tracking to the piece of software may increase the complexity of the software to be shipped.

Alternatively, operating system-implemented software updating services may be limited to certain software vendors, may not offer patch-specific updating mechanisms, and are generally limited to one operating system in their applicability. However, some software vendors may wish to simultaneously release patches for multiple versions of the same application on different operating systems, which may be difficult to achieve with multiple operating system-specific software updating services.

SUMMARY

A system method for cross-platform patching of applications is disclosed. The method may include deploying a patch package on a first computer running a first type of operating system, and executing the patching mechanism on the first computer. In one embodiment, the patch package may include a patching mechanism operable to execute on a second computer running a second type of operating system. The patch package may also include a first set of one or more new code components, which may replace a first set of one or more old code components in a first application. In a further embodiment, the method may additionally include deploying the patch package on the second computer. The method may also include replacing a second set of one or more old code components in a second application on the second computer with a second set of one or more new code components included in the patch package.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Figure 1:
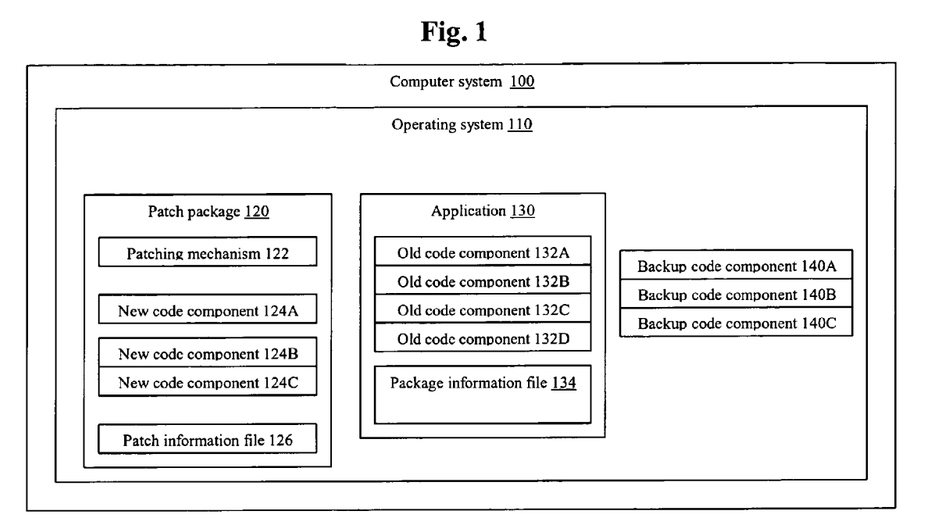
FIG. 1 illustrates a block diagram of a computer system, according to one embodiment.

Turning now to FIG. 1, a block diagram of a computer system 100 is shown. Operating system 110 executes on computer system 110, and is operable to execute, modify or manipulate patch package 120, application 130, and backup code components 140 A-C.

Operating system 110 may take the form of Microsoft Windows, Linux, Sun Solaris, Apple OS X, or other type of operating system. Operating system 110 is operable to provide various services to the end user and provide a software framework operable to support one or more applications, including application 130.

Application 130 may be any type of computer application, utility, or group of scripts executable on computer system 110. For example, application 130 may provide functionality including, but not limited to, text processing, graphical processing, network or Internet applications, scientific applications, multi-media, game software, or system utilities. Application 130 may be executable on one or more types of operating system, depending on the format of target application 130. For example, application 130 may be a native application, or a Java application or Perl script operable to execute on Solaris, Linux, or Windows.

Application 130 may comprise multiple currently installed code components (old code components 132A-D), which may be, for example, dynamically linked libraries, Java classes, interpreted scripts, or other type of shared library component, depending on the format of application 130. Each old code component 132A-D may be operable to provide certain functionality associated with application 130. Each old code component 132A-D may further be configured to be replaceable with a newer code component to correct program errors or "bugs" in application 130, as will be described further below.

It is noted that, depending on the format of application 130, old code components 132A-D may be grouped into one or more packages such as Java archive (JAR) files, for example. A package information file 134 may be associated with application 130. The package information file 134 may provide information on the arrangement, state, and functionality of old code components 132A-D. In one embodiment, the information in package information file 134 may include, but not be limited to, the following fields:

| | |
|---|---|
| Package ID# | ID number of the package information file |
| Root Directory | directory where the package information file is stored |
| Origin Date | time this application package can be applied |
| Create Date | time package was created |
| Install Date | time package was installed on the system |
| Product Version | version of the product this package is associated with |
| Description | brief text description of what package contains |
| Architecture | hardware platform this package is meant for |
| OS | operating system this package is meant for |
| Vendor | vendor this package came from |
| Patch list | list of patches installed on the application |
| Patch obsoletes | list of previous patches that are rendered obsolete by current installed patches |
| Patch requires | list of installed patches required by the application |
| Patch incompatible | list of patches incompatible with current patch status of the application |
| Patch revision | ID number of last patch installed on the application |

Patch package 120 may comprise patching mechanism 120, new code components 124A-C, and patch information file 126. Each new code component 124A-C may be a replacement for a corresponding old code component 132A-D in application 130. For example, new code component 124A may be a replacement for old code component 132A. Each new code component 142A-C may be designed to correct one or more bugs in application 130.

As with old code components 132A-D, each new code component 124A-C may be, for example, a dynamically linked library, Java class, interpreted script, or other type of shared library component, depending on the format of application 130. New code components 124A-C may likewise be grouped into one or more packages, such as JAR files, for example.

Each new code component 124A-C may further be operable to provide certain functionality associated with target application 130. It is noted that, in one embodiment, the format and functionality of new code components 124A-C may be substantially similar to corresponding old code components 132A-D, with only minor changes in the program code contained therein differentiating between the two sets of code components.

Patch information file 124 may contain information on new code components 124A-C, and how those components may be installed in target application 130 as will be described below.

Patching mechanism 122 may be executable on multiple different platforms or operating systems, and may be written in the Java programming language or a cross-platform scripting language such as Perl, for example, or other cross-platform language. Patching mechanism 122 is operable to replace old code components 132A-C with new code components 124A-C, as will be further described below.

It is noted that in one embodiment, patching mechanism 122 may be operable to create a reserve or "backup" copy of old code components 132A-C before replacing old code components 132A-C with new code components 124A-C. Therefore, backup code components 140A-C may represent code components replaced by a previous patch package. For example, one or more backup code components 140 may have been replaced by one or more old code components 132A-D.

It is further noted that in one embodiment, patching mechanism 120 may utilize one or more backup code components 140A-C to replace one or more old code components 132A-D, thereby removing, or "backing out" of a previously installed patch. This back out functionality may be utilized in the event of a patching error, as will be described below.

Figure 2:
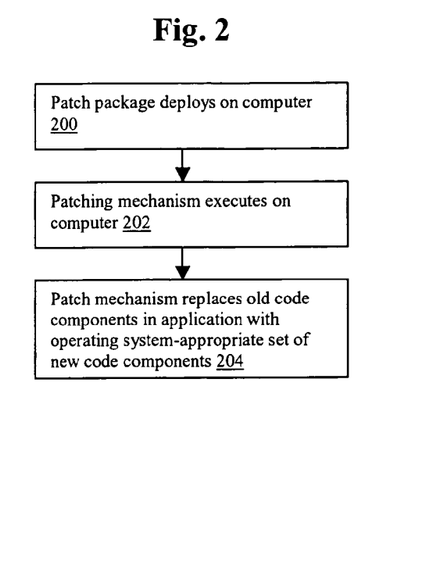
FIG. 2 is a flow diagram illustrating one embodiment of a method for a software patching mechanism.

FIG. 2 illustrates a flow diagram which gives a broad overview of one embodiment of a cross-platform patching mechanism. Referring collectively now to FIGS. 1-2, in 200 patch package 120 deploys on computer 100 and operating system 110. This deployment may comprise patch package 120 being downloaded via the Internet or other network, either manually or as part of a periodic maintenance check, for example. In another embodiments, patch package 120 may alternatively be acquired manually, via disk drive, CD or DVD, for example.

In 202, patching mechanism 122 executes on computer 100, as will be described in greater detail below. In one embodiment patching mechanism 122 may contain precise instructions controlling which application will have old code components replaced. Alternatively, patching mechanism 122 may be a generic patching utility operable to determine which application will have old code components replaced by reading instructions in patch information file 126. The patch application may be a stand-alone application, or may be one or more scripts that invoke a patch utility provided by the computer platform.

In 204, patching mechanism replaces one or more old code components 132A-D with one or more new code components 124A-C. It is noted that in one embodiment, patch package 120 may contain multiple sets or packages of new code components 124A-C, each set of which is operable to replace old code components in a different application.

It is noted that in one embodiment, each set of new code components in patch package 120 may correspond to a different, but functionally equivalent, application operable to execute on a different type of operating system. For example, new code component 124A may be operable to replace an old code component on a Solaris version of an application server product, while new code components 124 B-C may be operable to replace old code components on a Windows version of the same application server product.

Figure 3:
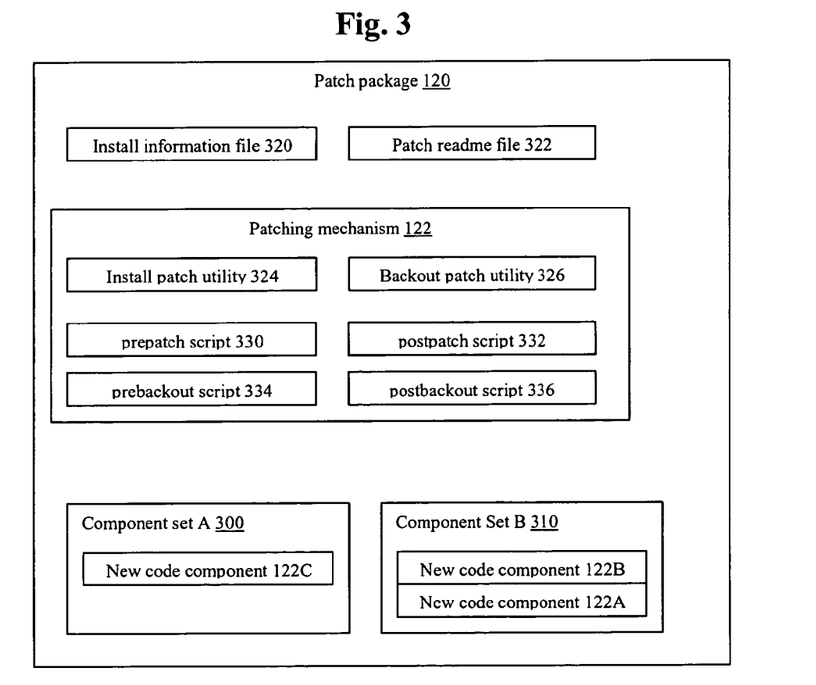
FIG. 3 illustrates a detailed block diagram of a patch package, according to one embodiment.

FIG. 3 gives a more detailed view of one embodiment of patch package 120, previously shown in FIG. 1. As illustrated in FIG. 3, patch package 120 contains component set A 300 and component set B 310, as described above in FIG. 2. Patch package 120 further contains installation information 320 and patch readme file 322, which may jointly perform the function of patch information file 126 in FIG. 1. In one embodiment, installation information file 320 may be a text file containing installation instructions for new code components 124A-C. In various embodiments, these installation instructions may be intended for an end user, patching mechanism 122, or both.

Patch readme file 322 may contain detailed information on the state, usage, and limitations of patch package 120. In one embodiment, a patch readme file may be provided for each platform for which the patch package applies. In one embodiment, patch readme file 322 may include, but not be limited to, the following fields of information:

| | |
|---|---|
| Patch ID# | unique ID number of the patch package |
| Keywords | Keywords associated with which bugs this patch fixes or what target application it is configured for |
| Origin date | time this patch can be applied |
| Create date | creation date of this patch |
| Install date | installation date of this patch |
| Bug ID#s fixed | list of identification numbers associated with specific bugs this patch is operable to correct |
| Architecture | hardware platform this patch is meant for |
| OS | operating system this patch is meant for |
| Version | version of target application this patch is meant for |
| Packages | list of components or patch packages this patch will effect |
| Obsoletes | list of patches this patch will render obsolete |
| Requires | list of patches that must be installed prior to the installation of this patch |
| Incompatible | list of patches this patch is incompatible with |
| Prepatch | does this patch include a prepatch utility? |
| Postpatch | does this patch include a postpatch utility? |
| Prebackup | does this patch include a prebackout utility? |
| Postbackup | does this patch include a postbackout utility? |
| Files added | full list of all components and files this patch will add |
| Files deleted | full list of all files this patch will delete |
| Files replaced | full list of all files this patch will replace |
| Instructions | Instructions for the manual installation of the patch |

Patch package 120 may also include install patch utility 324 and backout patch utility 326. In one alternate embodiment, patch package 120 may additionally include prepatch script 330, postpatch script 332, prebackout script 334, and postbackout script 336. These utilities and scripts in combination may perform the function of patching mechanism 122, as will be described further below.

Figure 4:
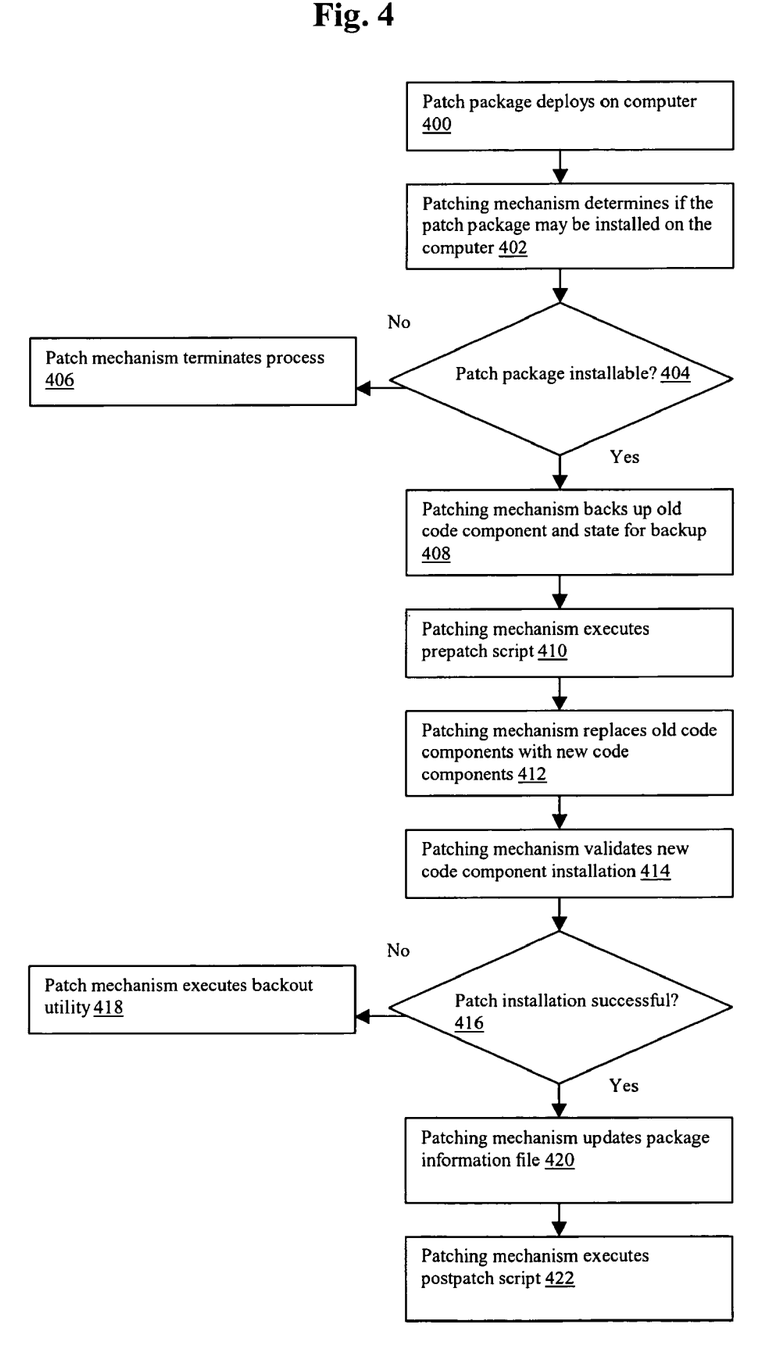
FIG. 4 is a flow diagram illustrating a detailed embodiment of a method for a software patching mechanism.

FIG. 4 illustrates a flow diagram which gives a detailed overview of one embodiment of a cross-platform patching mechanism. Referring collectively now to FIGS. 1-4, in 400 patch package 120 deploys on computer 100 as described above in FIG. 2. In 402 install patch utility 324 determines if the patch package may be installed on computer 100 and application 130, the details of which are described below in FIG. 5. Once this determination has been made, install patch utility 324 may advance to step 404.

If install patch utility 324 determines that patch package 120 is not installable, control flow may advance from 404 to 406, wherein install patch utility 324 may terminate the process. In one embodiment install patch utility may send an error message to a system administrator or end user, while in another embodiment, an automatic version resolution system may be activated.

If install patch utility 324 determines that patch package 120 is installable, control flow may advance to step 408, wherein old code components and current program state may be stored for future backup. In one embodiment, install patch utility may store a copy of old code components 132A-D in a separate location within computer system 100. In one embodiment, old code components 132A-D may overwrite backup code components 140A-C, while in another embodiment, old code components 132A-D may be stored in a separate location from backup code components 140A-C. Install patch utility 324 may also store a copy of various environmental variables and supporting configuration files needed to restore the pre-patch state of application 130.

In 410 install patch utility 324 may execute prepatch script 330 if patch readme file 322 indicates that a prepatch script should be executed. Prepatch script 330 may perform any patch-specific tasks required for patch 120 to successfully install, such as decompressing a file archive or preparing various code components to be added, copied, moved, or deleted.

In 412 install patch utility 324 replaces one or more old code components 132A-D with one or more new code components 122A-C. As described above, new code components 122A-C may be grouped in to one or more sets, only one of which is applicable to the version of application 130 which executes on operating system 110. Install patch utility 324 may be a patch specific script or executable which is operable to install only those new code components 122A-C which are specific to application 130. Alternatively, install patch utility 324 may be a generic installation utility which determines which code components are to be replaced from instructions or data found in install information file 320 or patch readme file 322.

In 414 install patch utility 324 may attempt to validate the installation of new code components 122A-C. In one embodiment, install patch utility may execute a test script or other automated testing mechanism to determine if the installed new code components 122A-C operate correctly, both individually and when interacting with each other and other previously installed code components. Control flow may then advance to 416.

If install patch utility 324 determines that patch installation has been unsuccessful and that new code components 122A-C have not been properly installed or are not functioning properly, install patch utility 324 may advance to step 418, wherein backout patch utility 326 is executed to remove new code components 122A-C. A detailed overview of the execution of backout patch utility 326 is given below in FIG. 7.

If install patch utility 324 determines that the patch installation has been successful and that new code components 122A-C are functioning correctly, install patch utility 324 may advance to step 420, wherein install patch utility 324 updates package information file 134, as will be described below in FIG. 6.

Once install patch utility 324 has updated package information file 134, control flow may advance to step 422, wherein install patch utility 324 may execute postpatch script 332 if patch readme file 322 indicates that a postpatch script should be executed. Postpatch script 332 may perform any patch-specific tasks required for patch 120 to successfully complete installation, such as compressing a saved set of files into an archive, for example.

Figure 5:
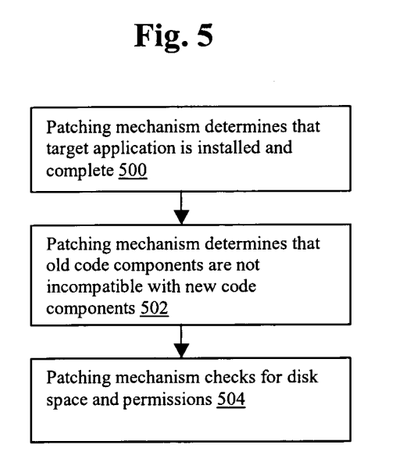
FIG. 5 is a flow diagram illustrating one embodiment of a method for determining that a patch package is installable.

Turning now to FIG. 5, a flow diagram which gives a detailed overview of one embodiment of step 402, wherein install patch utility 324 determines if patch package 120 may be installed on computer 100, is given. In 500, install patch utility 324 determines that application 130 and all required old code components 132A-D are installed. More particularly, 500 may comprise ensuring that all required previous patches have been installed according to the patch requires field of patch information file 126. Thus, before the patch may be installed, the patch utility may verify that all necessary code components and other patches are installed. Install patch utility 324 may also determine that old code components 132A-D are the version patch package 120 was designed to replace, as indicated by the patch ID field in package information file 134.

In 502, install patch utility 324 determines that old code components 132A-D are not incompatible with new code components 124A-C, as indicated by the patch incompatible field of package information file 134. Install patch utility 324 may additionally determine whether patch package 120 is outdated or has already been installed and removed by a replacement patch by examining the patch obsoletes field of the package information file for other patches. As will be described below, the patch obsoletes field of package information file 134 may contain information on what patches have already been replaced or obsoleted by currently installed patches.

In 504, install patch utility 324 may conclude step 402 by checking for the necessary disk space required for the various code component moves, copies and deletions. Install patch utility 324 may also check that the necessary permissions are available to move, copy, and delete the appropriate code components.

Figure 6:
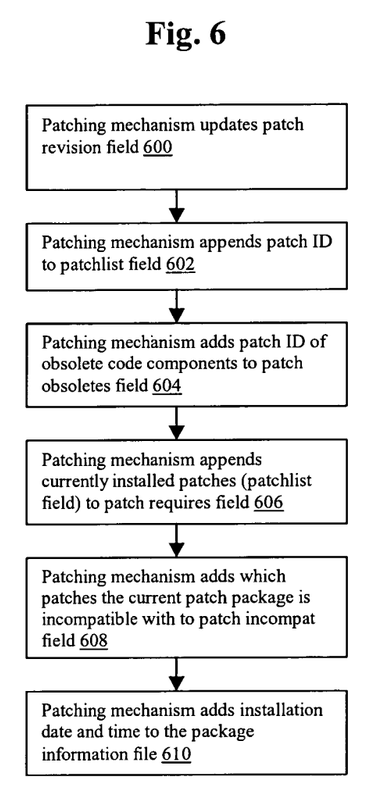
FIG. 6 is a flow diagram illustrating one embodiment of a method for modifying a package information file.

Turning now to FIG. 6, a flow diagram which gives a detailed overview of one embodiment of step 420, wherein install patch utility 324 updates package information file 134 to reflect the addition of new code components 124A-C. In 600, install patch utility 324 updates the patch revision field in package information file 134 with the patch ID of patch package 120 from patch information file 126. It is noted that because the patch ID of patch package 120 is a unique identifier, copying it to package information file 134 may definitively identify which set of code components are currently contained and active in application 130.

In 602, install patch utility 324 appends the patch ID of patch package 120 to the patchlist field, thereby allowing patch mechanism 120 to determine which patches have already been applied by previous patch packages. In 604, install patch utility 324 adds the patch ID of the now-removed old code components 134A-D to the patch obsoletes field. In 606, install patch utility 324 appends the patchlist field, which comprises all the previously added patches, to the patch requires field, thereby allowing patching mechanisms to determine which patches are required for the application 120 to function correctly.

In 608, install patch utility 324 adds the list of patches that patch package 120 is incompatible with to the patch incompatible field of package information file 134. This list of incompatibilities may be copied from the incompatible field of the patch readme file 322. In 610, install patch utility 324 adds the time and date of the patch installation to package information file 134.

Figure 7:
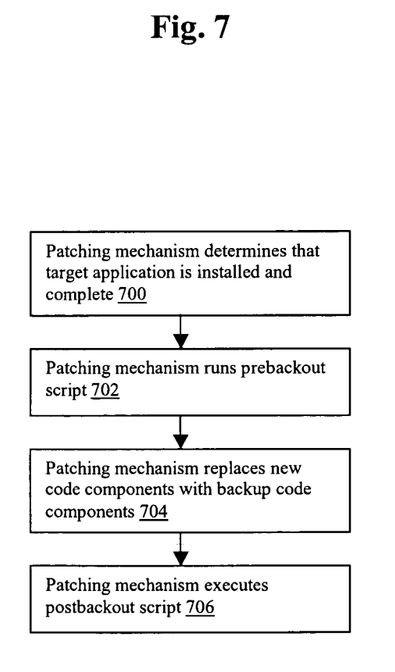
FIG. 7 is a flow diagram illustrating one embodiment of a method for backing out of a patch installation.

Turning now to FIG. 7, a flow diagram which gives a detailed overview of one embodiment of step 418, wherein backout patch utility 326 removes new code components 124A-C from application 130 after determining that the patch installation was not successful in 414. It is further noted that in one embodiment, backout patch utility 326 may be invoked when a currently installed patch is incompatible with a new patch.

In 700, backout patch utility 326 determines that application 130 and all required code components are installed. In one embodiment, code components to be removed in application 130 may be new code components 124A-C that have been determined to be non-functional. Alternatively, the code components to be removed in application 130 may be old code components 132A-D which have been determined incompatible with the patch incompatible field of a new patch package's patch readme file 322.

More particularly, in one embodiment, 700 may comprise determining that the code components comprising the patch to be removed are already installed in application 130. Step 700 may further comprise determining if it is proper to backout the patch. For example, a patch should not be backed-out if the patch(es) to be removed is part of the patch required field of package information file 134, or part of the patch obsoletes field of package information file 134. If, in 700, it is determined that the patch should not be backed-out, the backout patch utility may not continue.

In 702, backout patch utility 326 executes prebackout script 334, which may execute various tasks necessary to begin the backout process, such as preparing or decompressing files or components needed for the backout processes, and/or gather system information and state information. In 704, backout patch utility 326 executes the backout by replacing code components in application 130 with one or more backup code components 140A-C. In one embodiment the replaced code components from application 130 may be deleted, while in another they may be saved to another location. In 706, backout patch utility 326 executes postbackout script 336, which may execute various tasks necessary to complete the backout process, such as restoring state information, updating a log, etc.

Figure 8:
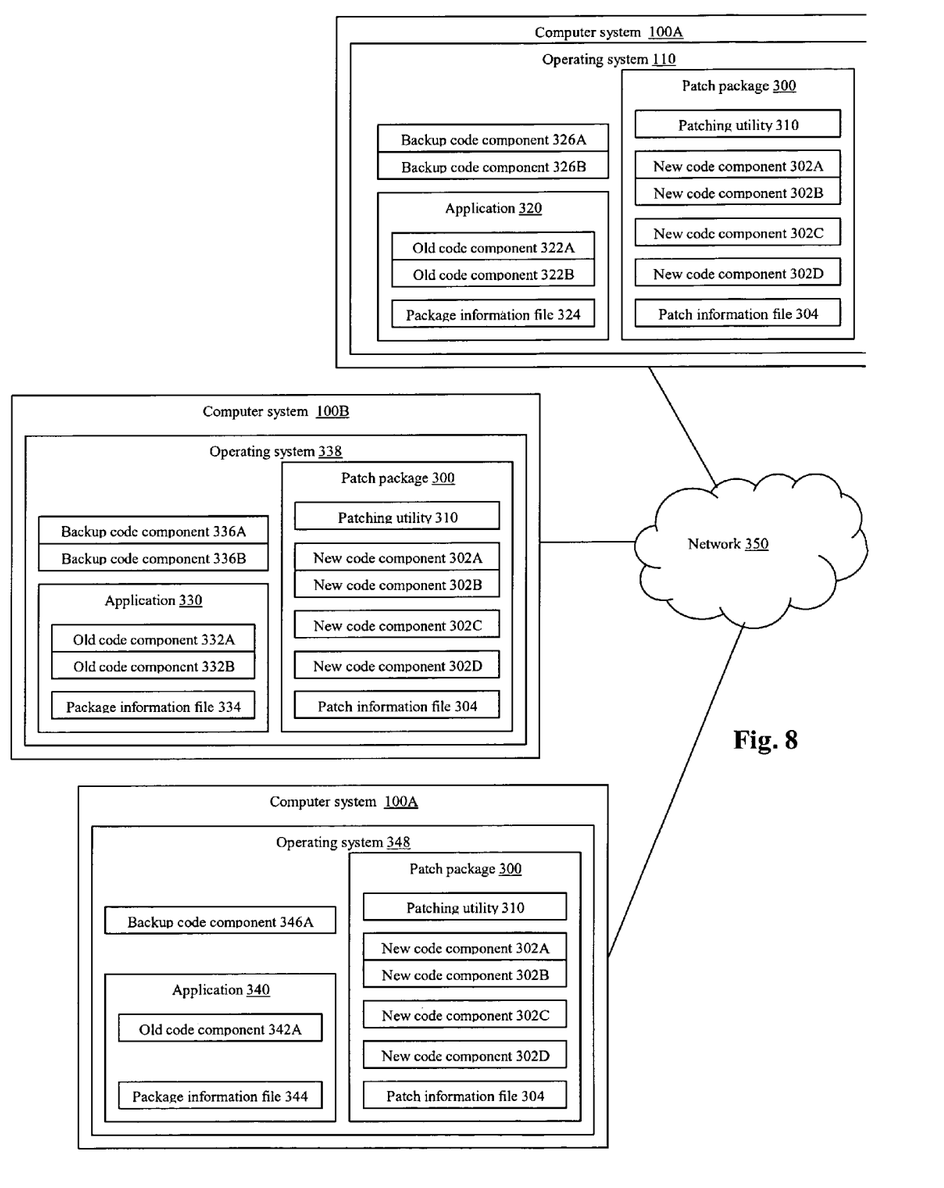
FIG. 8 illustrates a detailed block diagram of multiple computer systems connected by a network, according to one embodiment.

Turning now to FIG. 8, multiple exemplary computer systems 100A-C are illustrated, each connected by a network 350. It is noted that each computer system 100A-C may represent a different hardware and/or software platform and may execute a different type of operating system 110, 338 or 348. For example, operating system 110 and computer system 100A may represent Linux running on an AMD x86 architecture, while operating system 338 and computer system 100B may represent Solaris running on a Sun Microsystems server. Network 350 may be a local area network (LAN), a wide area network (WAN), the Internet, or a combination thereof.

Each computer system 100A-C includes an application 320, 330, or 340, similar to application 130 in FIG. 1. Each application 320, 330 and 340 may be functionally equivalent to other applications 320, 330, or 340. For example, application 320 may be may be a Linux version of an application server, while application 330 may be a Solaris version of the same application server product. In one embodiment, each application 320, 330, or 340 may by a system-specific executable configured for the associated hardware platform or operating system of computer system 100A-C. Alternatively, each application 320, 330 and 340 may be written in Java or in a platform-independent scripting language such as Perl.

It is noted that each application 320, 330 and 340 may include various old code components 322A-B, 332A-B, and 342A, as well as package information files 324, 334 and 344.

Likewise, each computer system 100A-C may contain backup code components 326A-B, 336A-B, and 346A.

Each computer system 100A-C also includes a copy of patch package 300, which is similar to patch package 120 in FIG. 1. Patch package 300 may comprise new code components 302A-D, patch information file 304 and patching utility 310, each of which is similar to the corresponding components described in FIG. 1.

It is noted that new code components 302A-D may be grouped into one or more sets of components, each of which is applicable to patch an application 320, 330, or 340. In one embodiment, patching utility 310 may be operable to determine which new code component sets are operable to replace old code components in applications 320, 330 or 340 according to information in package information files 324, 334, 344 and patch information file 304.

It is thus contemplated that in one embodiment, a single patch package 300 and a single patching mechanism or utility 310 may be operable to provide patch installations on a variety of functionally similar applications 320, 330, and 340, wherein each application is configured to operate on a different hardware platform and/or operating system type.

Figure 9:
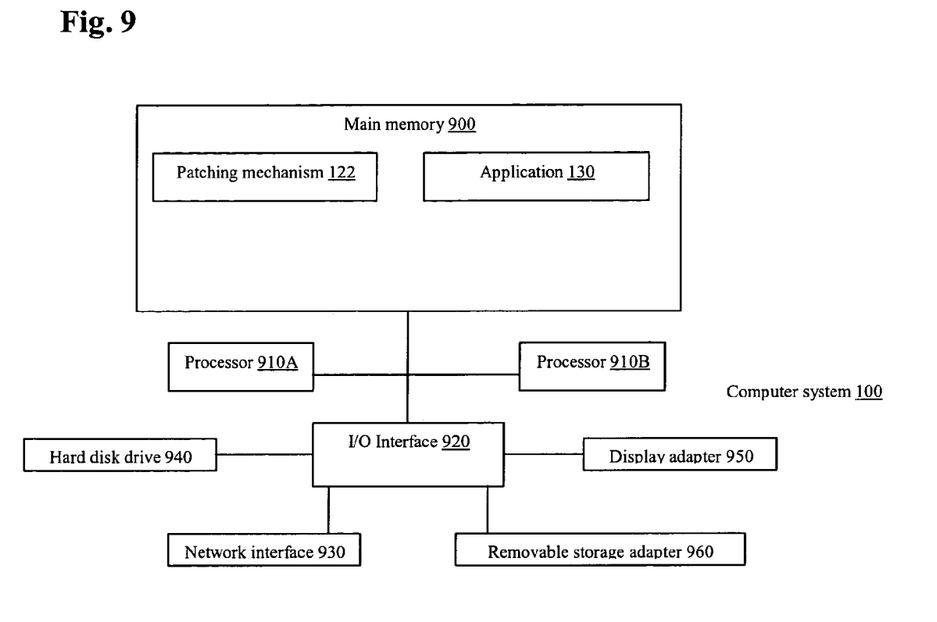
FIG. 9 illustrates an exemplary computer subsystem for implementing a software patching mechanism, according to one embodiment.

Turning now to FIG. 9, a hardware overview of exemplary computer system 100 is shown. Computer system 100 includes main memory 900, which is coupled to multiple processors 910A-B, and I/O interface 920. It is noted that the number of processors is purely illustrative, and that one or more processors may be resident on the node. I/O interface 920 further connects to network interface 930, hard disk drive 940, display adapter 950, and removable storage adapter 960. Such a system is exemplary of a laptop, desktop, server, or workstation.

Processors 910A-B may be representative of any of various types of processors such as an x86 processor, a PowerPC processor or a CPU from the SPARC family of RISC processors. Likewise, main memory 900 may be representative of any of various types of memory, including DRAM, SRAM, EDO RAM, DDR SDRAM, Rambus RAM, etc., or a non-volatile memory such as a magnetic media, e.g., a hard drive, or optical storage. It is noted that in other embodiments, main memory 900 may include other types of suitable memory as well, or combinations of the memories mentioned above.

As described in detail above in conjunction with FIGS. 1-8, processors 910A-B of computer system 100 may execute software configured to execute a method for software patching for cross-platform products. The software may be stored in memory 900 of computer subsystem 100 in the form of instructions and/or data that implement the operations described above.

For example, FIG. 9 illustrates an exemplary patching mechanism 122, patch package 120 and application 130 stored in main memory 400. The instructions and/or data that comprise these and all other included components may be executed on one or more of processors 910A-B, thereby implementing the various functionalities of the method and system described in FIGS. 1-8.

Various embodiments may further include receiving, sending or storing instructions and/or data that implement the operations described above in conjunction with FIGS. 1-8 upon a computer readable medium. Generally speaking, a computer readable medium may include storage media or memory media such as magnetic or optical media, e.g. disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for patching applications, comprising:
    deploying a patch package on a first computer running a first type of operating system,
        wherein the patch package comprises a patching mechanism and a first set of one or more new code components, and
        wherein the patching mechanism is executable on the first computer running the first type of operating system to install the first set of one or more new code components and is also executable on a second computer running a second type of operating system to install one or more new code components;
    wherein the patching mechanism and the first set of one or more new code components are deployed together on the first computer as part of the same patch package; and
    executing the patching mechanism on the first computer,
        wherein executing the patching mechanism comprises the patching mechanism performing a replacement of a first set of one or more old code components in a first application with the first set of one or more new code components.

2. The method of claim 1, further comprising:
    deploying the patch package on the second computer,
        wherein the patch package further comprises a second set of one or more new code components; and
    executing the patching mechanism on the second computer,
        wherein executing the patching mechanism comprises the patching mechanism replacing a second set of one or more old code components in a second application with the second set of one or more new code components,
            wherein the second application is functionally equivalent to the first application.

3. The method of claim 1 wherein the patching mechanism is written in a cross-platform language.

4. The method of claim 1 wherein the patching mechanism is a script written in a cross-platform scripting language.

5. The method of claim 1, further comprising storing the first set of one or more old code components in a separate location before being replaced with the first set of one or more new code components.

6. The method of claim 5, further comprising restoring the first set of one or more old code components to the first application.

7. The method of claim 1 wherein the patch package further comprises a patch information file, wherein the patch information file comprises information on the first set of one or more new code components and information regarding which application the patch package is applicable to patch.

8. The method of claim 7, wherein the patch information file further comprises information on what bugs the patch package is operable to fix, and information regarding which other patch packages the patch package is incompatible with.

9. The method of claim 8, further comprising storing information on one or more other patch packages that have been previously applied to the first application in a package information file.

10. The method of claim 9, further comprising detecting patch conflicts by comparing the patch information file to the package information file.

11. The method of claim 1 wherein the user interface for the patching mechanism is the same on different platforms.

12. A system for patching applications, comprising:
- a first computer comprising one or more processors configured during operation for running a first type of operating system;
- a first application executable on the first computer,
  - wherein the first application comprises one or more old code components; and
- a patch package comprising a patching mechanism and a first set of one or more new code components,
  - wherein the patching mechanism is executable on the first computer running the first type of operating system to install the first set of one or more new code components to replace the one or more old code components with the first set of one or more new code components, and
  - wherein the patching mechanism is also executable on a second computer running a second type of operating system to install one or more new code components;
  - wherein the patching mechanism and the first set of one or more new code components are deployed together on the first computer as part of the same patch package.

13. The system of claim 12, further comprising:
- a second application executable on the second computer,
  - wherein the second application comprises a second set of one or more old code components, and
  - wherein the second application is functionally equivalent to the first application; and
- a second set of new code components,
  - wherein the second set of new code components is stored in the patch package, and
  - wherein the patching mechanism is executable on the second computer to replace the second set of one or more old code components with the second set of one or more new code components.

14. The system of claim 12 wherein the patching mechanism is written in a cross-platform language.

15. The system of claim 12 wherein the patching mechanism is a script written in a cross-platform scripting language.

16. The system of claim 12 wherein the patching mechanism is further operable to store the first set of one or more old code components in a separate location before being replaced with the first set of one or more new code components.

17. The system of claim 16 wherein the patching mechanism is further operable to restore the first set of one or more old code components to the first application.

18. The system of claim 12 wherein the patch package further comprises a patch information file, wherein the patch information file comprises information on the first set one or more new code components and information regarding which application the patch package is applicable to patch.

19. The system of claim 18, wherein the patch information file further comprises information on what bugs the patch package is operable to fix, and information regarding which other patch packages the patch package is incompatible with.

20. The system of claim 19 wherein the patching mechanism is further operable to store information on one or more other patch packages that have been previously applied to the first application in a package information file.

21. The system of claim 20 wherein the patching mechanism is further operable to detect patch conflicts by comparing the patch information file to the package information file.

22. The system of claim 12 wherein the user interface for the patching mechanism is identical on different platforms.

\* \* \* \* \*

UNITED STATES PATENT AND TRADEMARK OFFICE
CERTIFICATE OF CORRECTION

Page 1 of 1

PATENT NO.       : 7,735,078 B1
APPLICATION NO.  : 10/696964
DATED            : June 8, 2010
INVENTOR(S)      : Neelam N. Vaidya It is certified that error appears in the above-identified patent and that said Letters Patent is hereby corrected as shown below:

In the Drawings, on sheet 4 of 6, in Figure 6, Box 608, line 3, delete "incompat" and insert -- incompatible --, therefor.

In column 12, line 18, in claim 18, after "set" insert -- of --.

Signed and Sealed this
Twelfth Day of July, 2011

David J. Kappos
*Director of the United States Patent and Trademark Office*